Jan. 25, 1927.  T. MIDGLEY  1,615,472
TIRE MOLD
Filed May 27, 1925
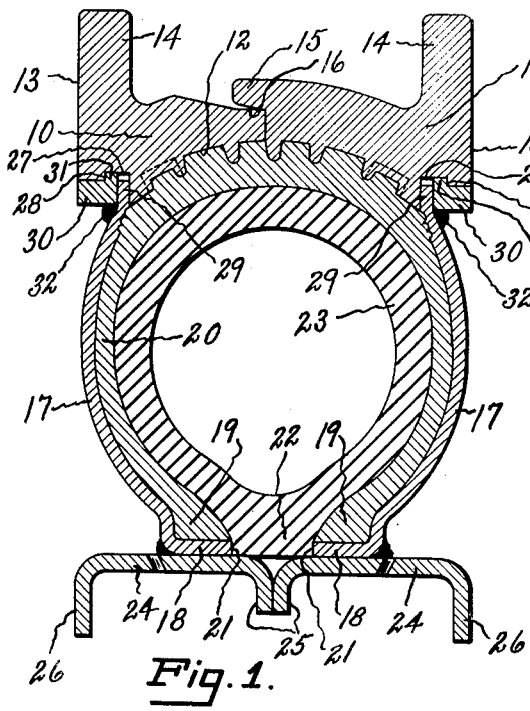
Fig.1.
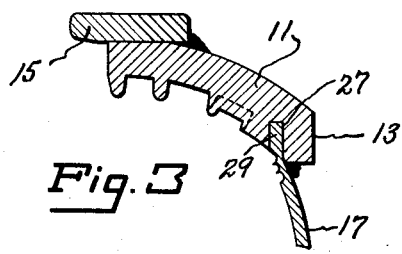
Fig.2.
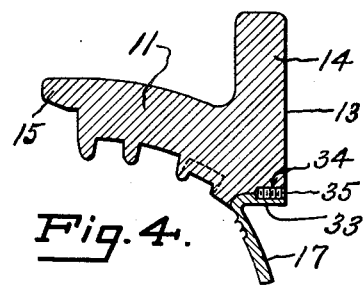
Fig.3.
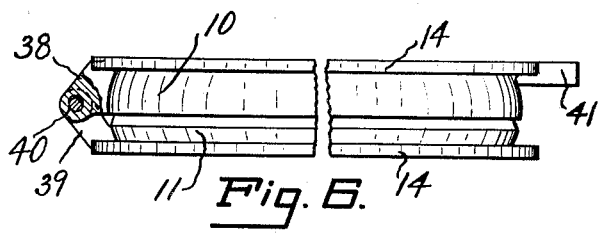
Fig.6.
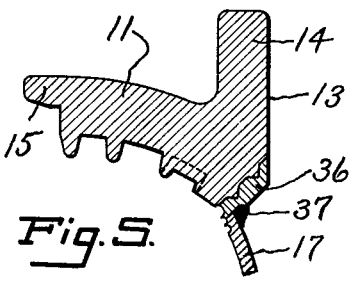
Fig.4.
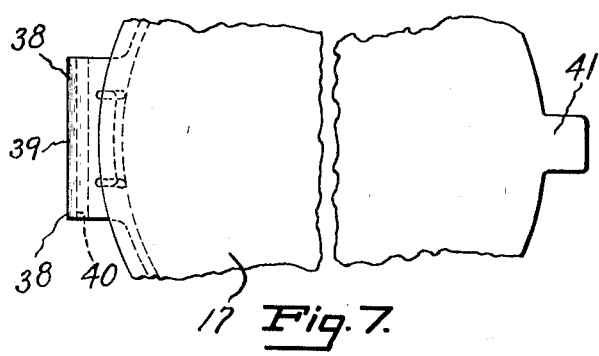
Fig.7.
Fig.5.
INVENTOR.
Thomas Midgley
BY Edward Taylor
ATTORNEY.

Patented Jan. 25, 1927.

1,615,472

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

Application filed May 27, 1925. Serial No. 33,146.

This invention relates to molds particularly adapted for the vulcanization of automobile tire casings. It has for one object the provision of a mold of this character which will have great rigidity against lateral pressure and which at the same time will be relatively light in construction. It has for another object the provision of a mold much lighter than the usual cast mold, but which can be used beside the cast molds in the same vulcanizing system. It has for a further object the provision of a mold which is more rapid in the assembling and stripping operations than molds of the usual types.

Referring to the drawings,

Fig. 1 is a section of one modification of my improved mold, showing a tire mounted on a fluid-pressure bag in the process of molding;

Figs. 2 to 5 are detail sections of modifications;

Fig. 6 is a side elevation, partly in section, showing the preferred way of constructing the two mold halves; and Fig. 7 is a fragmentary plan of the mold shown in Fig. 6.

Describing first the modification shown in Fig. 1, the mold is formed of a pair of annular tread-forming members 10 and 11 having a tread pattern 12 cut in their inner surfaces. These members may be formed of cast or forged metal and are heavy enough to withstand the heavy pressure to which they are subjected by the hydraulic press used in vulcanization. They are provided with bearing surfaces 13 against which this lateral pressure may be exerted either by the press or by adjacent molds, and with prying flanges 14 aiding in stripping the mold from a vulcanized tire. One tread member has a circumferential projection 15 which overlies a shoulder 16 on the other to align the mold halves when assembled.

The side plates 17 are formed from sheet steel or other material of substantially uniform thickness and are curved to the shape of the sides of the tire. At their inner peripheries they are bent over to form flanges 18 underlying the beads 19 of the tire 20, their spaced edges 21 affording place between them for the base 22 of the fluid pressure bag 23. Rings 24 are attached to the inturned edges of the side plates as by spot welding and have flanges 25 and 26. Flanges 25 abut each other and may be clipped together in order to hold the mold temporarily assembled during handling if desired, although with the type of mold here under consideration this is not necessary, the molds being generally handled with their axes vertical. Flanges 26 have their outer faces in the same plane as the bearing surfaces 13 of the tread rings, that plane being preferably spaced slightly beyond the widest part of the sidewalls so as to relieve the latter of any compressive strain resulting from the action of the hydraulic press or the weight of superposed molds. The sidewalls in the present mold are designed to withstand only the expansive force due to the pressure exerted through the bag 23, and can accordingly be made much lighter than if they had to bear compressive strains as well. The manner in which the inner periphery of the mold is formed is substantially that described in my copending application for patent Serial No. 625,728, and is preferred as conducive to lightness. Other methods of construction may, however, be used without departing from the present invention as set forth in the appended claims.

The molds of the present invention are designed to consist of two mating halves, split in about the central plane of the mold, and with all the parts in each half permanently connected together. In the modification shown in Fig. 1 the tread rings 10 and 11 are formed with circumferential grooves 27, somewhat wider than the thickness of the side plates and having one side 28 of a larger diameter than the other. The side plates 17 are provided with portions 29 parallel to the plane of the mold which fit into the grooves 27, being held therein by rings 30 transversely split at one point so that they may be sprung into place. Flanges 31 on the rings fit into the grooves 27, securely binding the side plates in position. If the rings be now welded to the side plates as indicated at 32 a permanent assembly of the parts will result. This construction is necessary only in case the tread rings are made of cast iron, since the steel side plates cannot be welded readily to cast iron. If the tread rings were made of steel, rings 30 could be dispensed with and the side plates welded on directly.

In Fig. 2 a modification of the method of attachment of the side plate to the tread ring is shown. In this case the groove 27 is made of substantially the thickness of the side plates, and the side plate is distorted during the operation of shaping it so as to force it outwardly into the groove. By forcing the side plate tightly into the groove a permanent assembly is made without the necessity of welding. In Fig. 3 is shown a similar modification, practically the reverse of that just described, the tread ring being made of steel and bent during forming to cause the groove to embrace the edge of the side plate. Both parts being steel in this case, they may be additionally secured by welding if desired. The modifications of Figs. 2 and 3 have been described more at length, and the method of making them claimed, in my copending application Serial No. 33,147 filed concurrently herewith.

The modification of Fig. 4 is an additional way of securing a permanent union between the tread rings and side plates. In this instance the side plates are formed with a right angled bend 33 fitting into a suitably machined part of the tread ring. After assembly holes 34 may be drilled and tapped at intervals around the circumference of the mold at the junction line of the tread ring and sidewall, and short rods 35 threaded in. This effectively prevents any displacement between the parts.

Fig. 5 shows a still further way of securing a permanent joining of the parts. Plates 36, preferably of steel, are in this case cast integral with the metal of the tread ring, in the manner described for casting end plates on the sections of tire cores in my Patent No. 1,157,118, granted October 19, 1915. The cast iron tread ring, now being surfaced with steel, can be welded directly to the side plates as indicated at 37.

In Figs. 6 and 7 I have illustrated the mold as a whole, showing the preferred way of forming it so as to facilitate stripping and assembly. At one side of the tread rings are interfitting hinge parts 38 and 39 connected by a pintle 40. The two halves of the mold are thus permanently hinged together. This facilitates stripping in that the mold halves are guided in the process of separating them from the enclosed tire, and speeds up the assembly of the mold around a fresh tire by avoiding the necessity of fitting dowel pins into holes, or other expedients commonly employed to insure accurate alignment of the mold halves. On the side of the mold opposite the hinge one of the mold halves is provided with a projecting lug 41 against which pressure may be applied in stripping the mold halves from the tire. A maximum leverage will be had by pressing on the mold at this point, and the hinge will insure that the stripping action will progress from one side to the other of the mold with a tilting motion, the most effective manner.

Having thus described my invention, I claim:

1. A two part mold adapted for the vulcanization of automobile tire casings formed in two mating annular halves; each half comprising a sheet steel sidewall portion shaped to the side of the tire, a cast iron tread molding portion carrying a tread molding design and having bearing surfaces to receive lateral thrust, and a bead molding surface formed from the inturned edges of the side plate and having a bearing surface rigidly attached adapted to receive lateral thrust, the sidewall and tread molding portion being formed as an integral whole.

2. A two part mold adapted for the vulcanization of automobile tire casings formed in mating annular halves; each half comprising a side plate of substantially uniform thickness curved to the shape of the side of the tire, and tread and bead molding portions each presenting surfaces adapted to receive lateral thrust without subjecting the side plate thereto, said mold halves being permanently hinged together at one side so as to open bookwise to permit the insertion of a tire to be vulcanized and so as to insure proper circumferential registration of the mold halves in closing, one of said halves having a projecting lug on the side opposite the hinge and adapted to receive a mold opening pressure.

3. A two part mold adapted for the vulcanization of automobile tire casings formed in mating annular halves; each half comprising a side plate of substantially uniform thickness curved to the shape of the tire, and tread and bead molding portions each presenting surfaces adapted to receive lateral thrust without subjecting the side plate thereto, said mold halves being permanently hinged together at one side so as to open bookwise to permit the insertion of a tire to be vulcanized and so as to insure proper circumferential registration of the mold halves in closing.

THOMAS MIDGLEY.